Feb. 28, 1928.  
S. B. WINN  
1,660,947  
OSCILLATORY COUPLING PIN FOR TRACTOR TRAILER COMBINATION  
Filed March 13, 1926   5 Sheets-Sheet 3

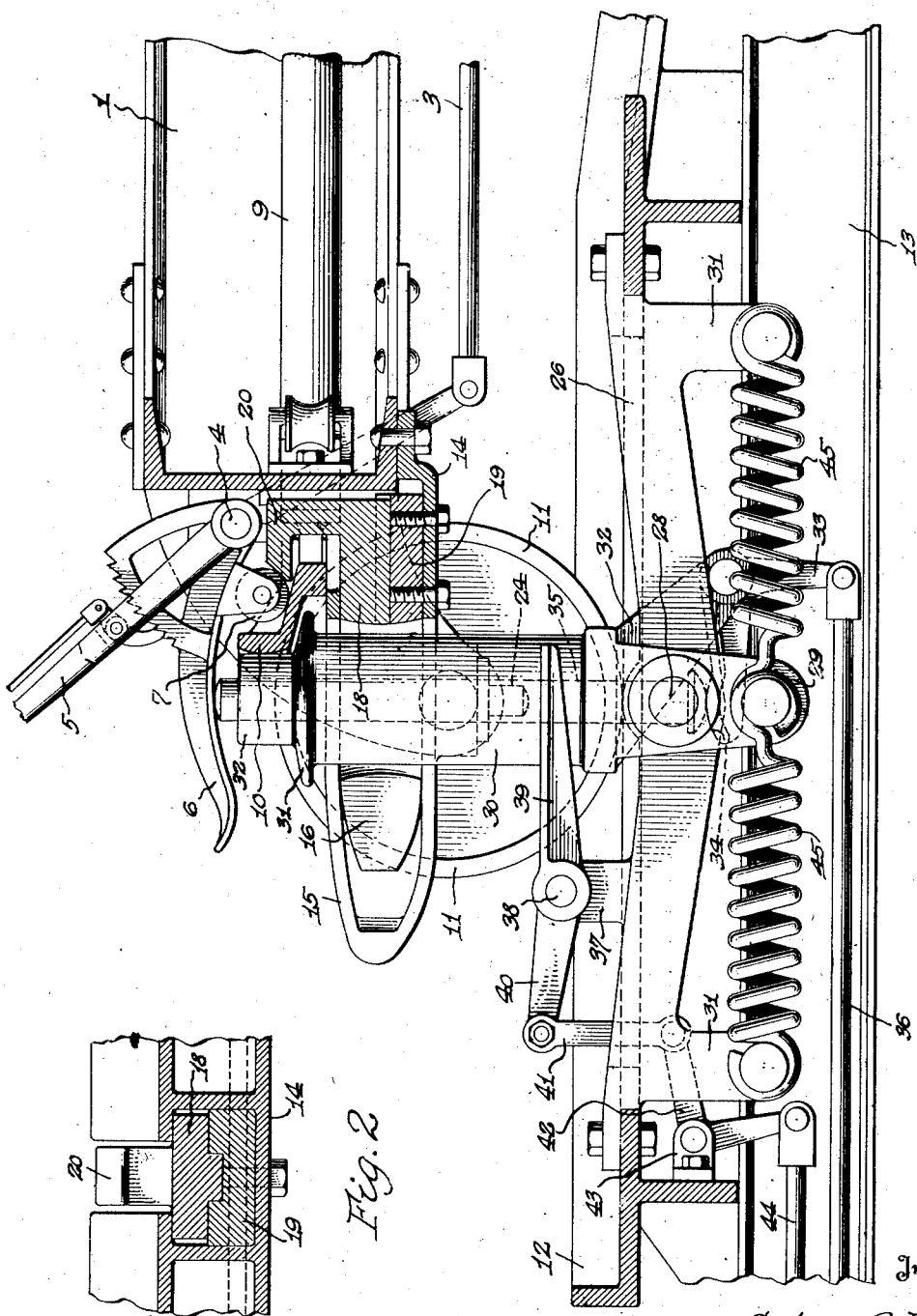

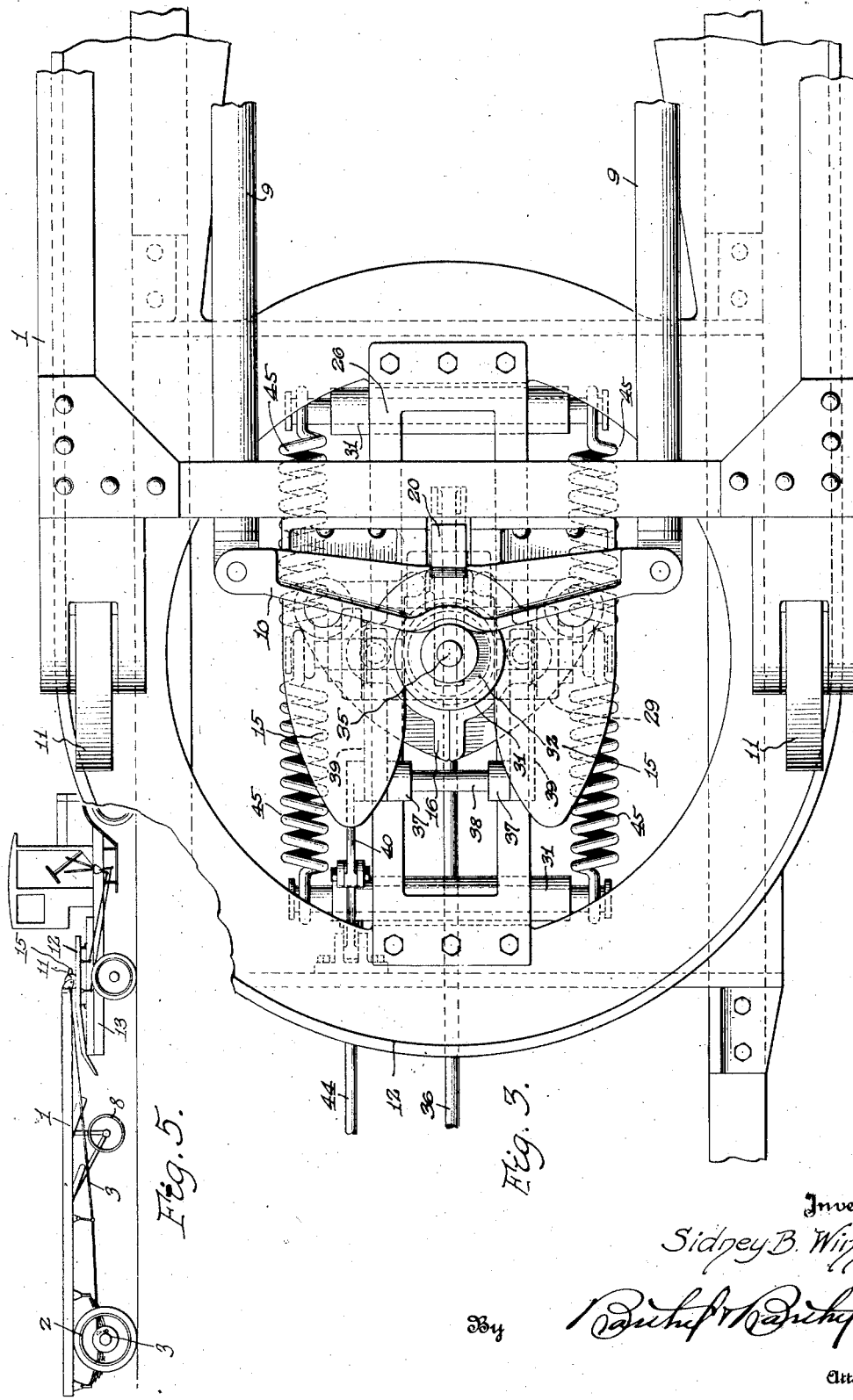

Inventor  
Sidney B. Winn,  
By  
Attorneys

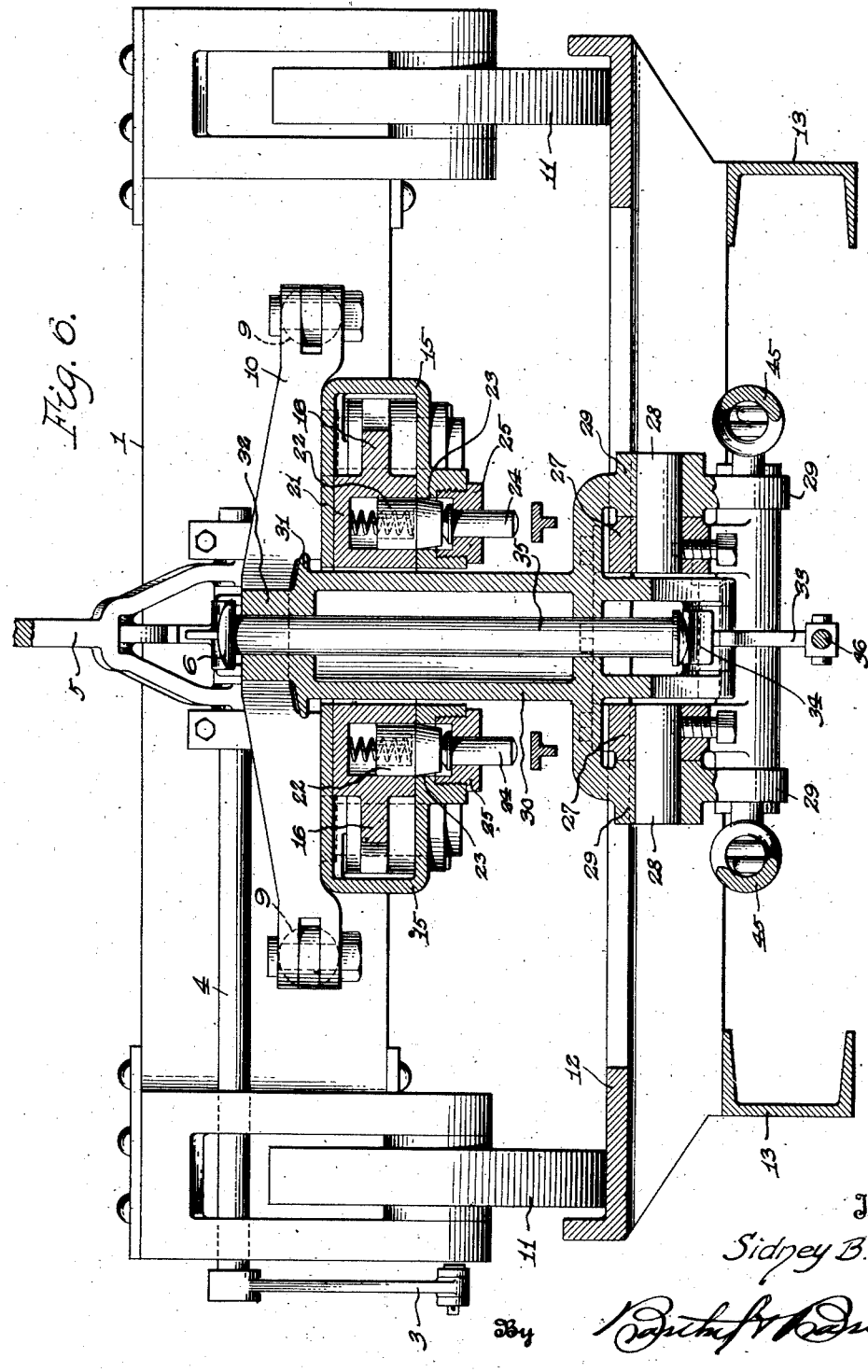

Feb. 28, 1928.
S. B. WINN
1,660,947
OSCILLATORY COUPLING PIN FOR TRACTOR TRAILER COMBINATION
Filed March 13, 1926    5 Sheets-Sheet 5
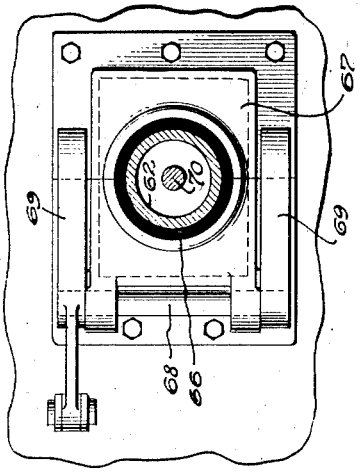
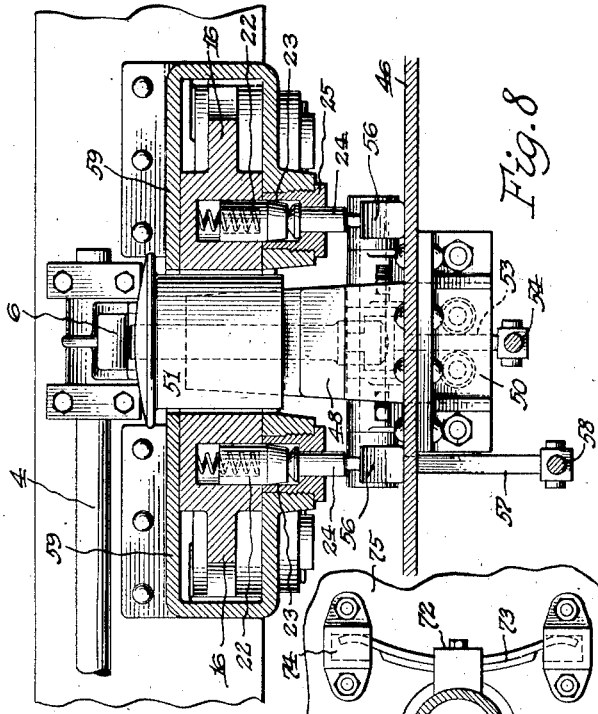
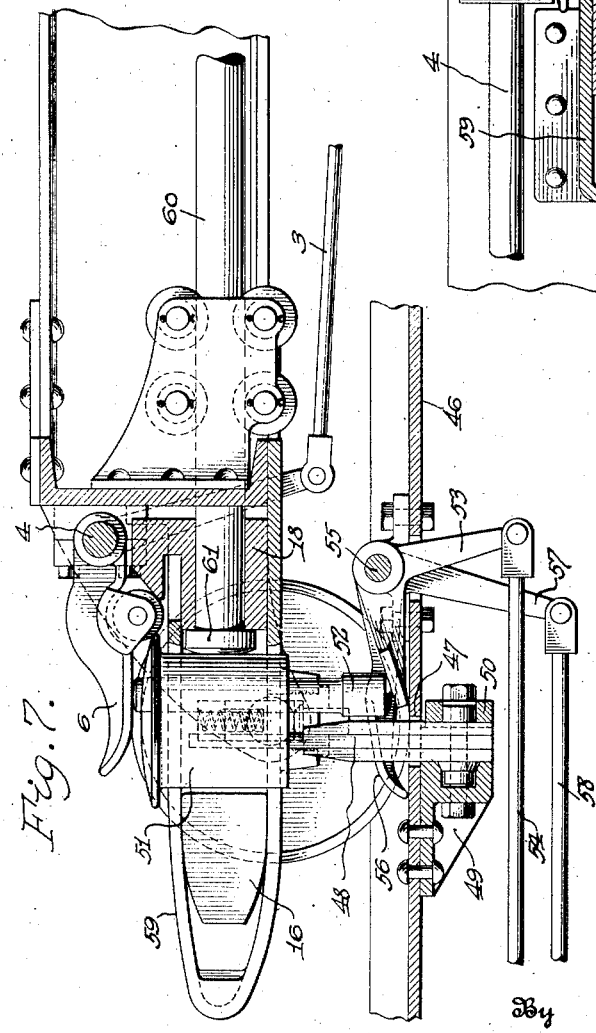
Inventor
Sidney B. Winn,
By
Attorneys Patented Feb. 28, 1928.

1,660,947

UNITED STATES PATENT OFFICE.

SIDNEY B. WINN, OF LAPEER, MICHIGAN.

OSCILLATORY COUPLING PIN FOR TRACTOR TRAILER COMBINATION.

Application filed March 13, 1926. Serial No. 94,407.

In my companion application filed March 13, 1926, Serial No. 94,406, there is disclosed a tractor trailer combination including a trailer coupler head and a tractor coupling pin by which the tractor and trailer may be operatively coupled together and in this companion application, as well as the present application, there are disclosed many tractor trailer features found in my Patents Nos. 1,548,968; 1,548,967 and 1,548,966, all dated Aug. 11, 1925. The tractor coupling or king pin has heretofore been rigidly supported in an upright position by a draft appliance of that type including a set of slide rods provided with cushioning springs so that there would be a yieldable connection between the tractor and trailer, the draft appliance allowing the coupling pin to shift longitudinally of the tractor incident to pulling or pushing operations of the tractor or when the trailer attempted to overrun or crowd the tractor.

Instead of employing the usual type of draft appliance with a rigid king or coupling pin thereon, I have designed an oscillatory or rockable king or coupling pin which is normally supported in an upright position but may yield or rock in a vertical plane longitudinally of the tractor, thus establishing a yieldable connection between tractor and trailer. In the preferred embodiment of my invention the pin is supported centrally of a tractor platform on which the forward end of a trailer is supported, and the lower end of the pin is yieldably held by opposed springs functioning as draft springs.

The tractor trailer combination includes a trailer having brakes that may be set by hand; set from the tractor, and automatically set when the trailer attempts to overrun the tractor. For controlling the trailer brakes from the tractor the tractor mechanism is arranged to be operatable through the oscillatory pin and I believe I am the first to control trailer brakes through a swingable king pin.

Again, the trailer includes a support for the forward end thereof so that the trailer may be used independent of the tractor. The support is arranged to descend to an active position by gravity during an uncoupling operation of the tractor and trailer, and said support is adapted to be raised to an inactive position when the tractor has its rear end backed under the forward end of the trailer. The oscillatory tractor pin is brought into use for raising the trailer support, but the resistance against any oscillatory movement of the pin is sufficient to insure movement of the trailer support by the pin when coupling the tractor to the trailer. Various types of springs may be used for resisting an oscillatory movement of the tractor pin and various embodiments of my invention in a tractor trailer combination will be hereinafter described and then claimed.

Reference will now be had to the drawings, wherein Figure 1 is a longitudinal sectional view of a portion of the tractor trailer combination showing the forward end of a trailer supported on the rear end of a tractor and coupled thereto by a coupler including an oscillatory king pin;

Fig. 2 is a cross sectional view of a portion of the trailer coupler head;

Fig. 3 is a plan of the tractor trailer combination shown in Fig. 1;

Fig. 5 is a diagrammatic elevation of a tractor trailer combination;

Fig. 6 is a cross sectional view of the tractor trailer coupler;

Fig. 7 is a longitudinal sectional view of a coupler having another type of oscillatory king pin;

Fig. 8 is a cross sectional view of the same;

Fig. 9 is a vertical sectional view of another form of oscillatory king pin;

Fig. 10 is a horizontal sectional view of the same shoe; and

Fig. 11 is a similar view showing another type of resistance for the oscillatory king pin.

Figure 4:
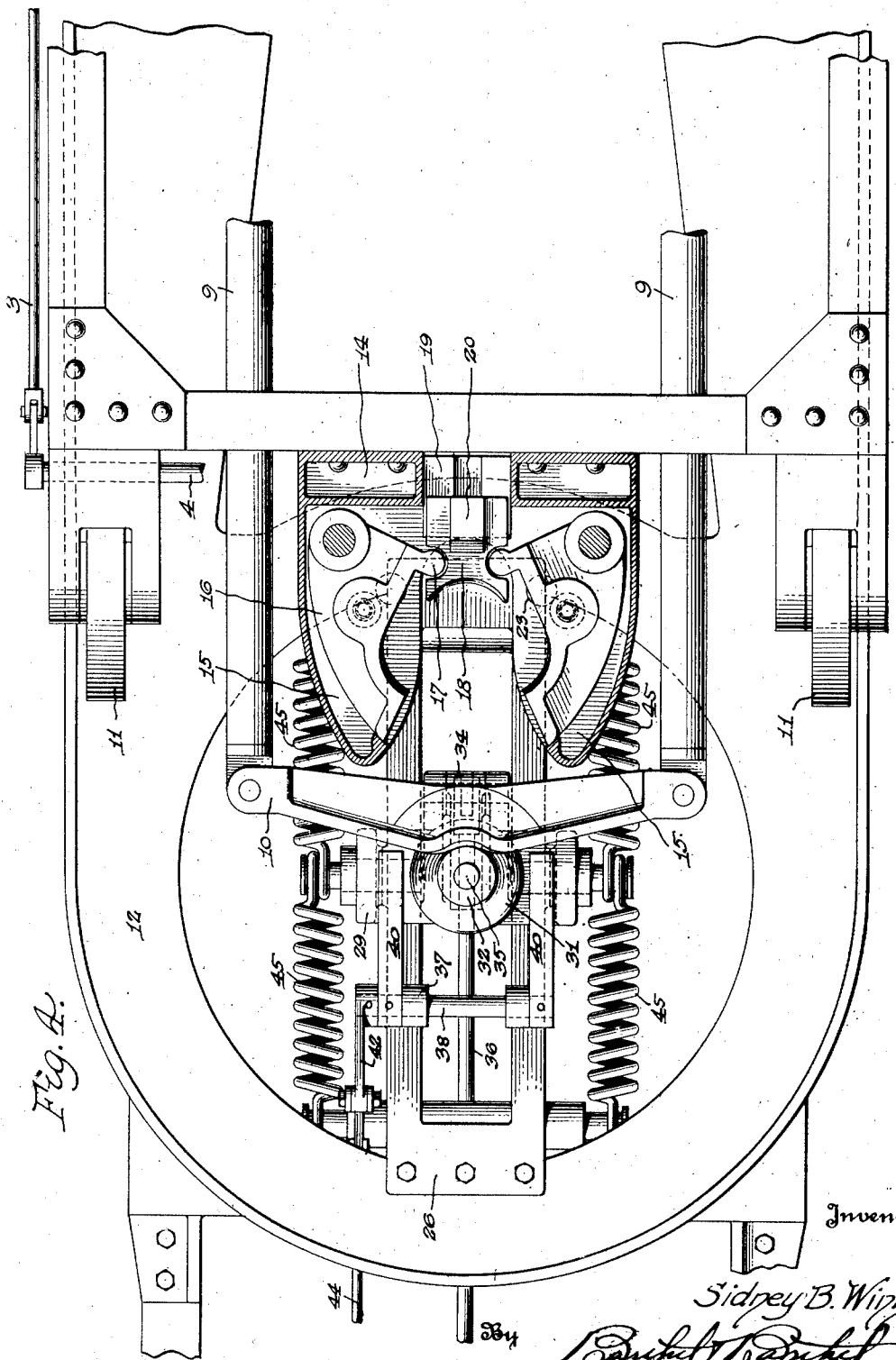
Fig. 4 is a similar view, partly in horizontal section, showing the tractor in a position it assumes when backing under the trailer.

Reference will first be had to Figs. 1 to 6 inclusive and the reference numeral 1 denotes a trailer chassis having a rear axle assembly or truck 2 provided with a conventional form of brake mechanism 3 which is adapted to be controlled, from the forward end of the trailer 1, by a rock shaft 4, a hand lever 5, a shoe 6 and a brake setting roller 7.

The trailer also includes a shiftable support 8 having forwardly extending support members 9 protruding from the forward end of the trailer and connected by a cross head 10 which is adapted to be pushed rearwardly to raise the support 8 to an inactive position.

On the forward end of the trailer are wheels 11 adapted to ascend an incline and rest on a platform 12 supported by the tractor chassis 13.

The trailer and tractor are adapted to be connected by a coupler and the trailer coupler equipment comprises a head 14 having opposed hollow jaws 15 provided with pivoted knuckles 16 adapted to be opened and closed. The knuckles 16 have arms 17 extending into a knuckle actuating member 18 slidable on a bearing 19 in the coupler head 14. Extending upwardly from the knuckle actuating member 18 is a brake setting member 20 adapted to ride under the roller 7 and apply the trailer brakes. Otherwise the roller 7 may rest on the cross head 10 and off of the brake setting member 20 so that the shoe 6 may be actuated for trailer brake setting purposes.

The knuckles 16 may be locked in a closed position and for this purpose said knuckles have housings 21 containing spring pressed locking members 22 held normally retracted by resting on the bottom walls of the jaws 15. The locking members 22 are adapted to enter openings 23 in the jaws 15 and secure the knuckles in a closed position. See Fig. 6. Engaging the locking members 22 are pins 24 carried by holders 25 attached to the jaws 15, and the pins 24 are adapted to be raised to elevate the locking members 22 and permit of the knuckles swinging outwardly to an open position, as best shown in Fig. 6.

The tractor equipment of the coupler includes a slotted support 26 which is set down in the platform 12 and secured thereto. Intermediate the ends of the slotted support 26 are bearings 27 provided with outwardly extending trunnions or pins 28 for the side ears 29 of the hollow king or coupling pin 30 having a head 31 and an abutment 32. The lower ends of the ears 29 are connected by sets of coiler springs 45 extending forwardly and rearwardly to depending brackets 31 carried by the support 26 and the arrangement of these springs is such that the pin 30 will be held normally upright, as shown in Fig. 1, but may swing in an arc having for its center the axis of the trunnions 28.

The lower end of pin 30, between the bearings 27 of the support 26, is provided with rearwardly extending bearings 32 for a bell crank 33 having a shoe 34 engaging the lower end of a brake pin 35 slidably mounted in the pin 30, said brake pin having its upper end under the shoe 6 and adapted to elevate said shoe to apply the trailer brakes. The bell crank 33 has a forwardly extending reach rod 36 which may be operated by the driver of the tractor to control the trailer brakes and this can be accomplished during any angular position of the oscillatory king pin 30.

Should the trailer attempt to overrun or crowd the tractor, the upper end of the king pin 30 will be pushed forwardly thus tilting the bearing 32 of the bell crank 33. With the reach rod 36 held from the tractor it is obvious that the shoe 34 will be raised thereby elevating the brake pin 35 to actuate the shoe 6 and apply the trailer brakes, thus retarding the crowding action of the trailer relative to the tractor.

The tractor equipment also includes bearings 37 on the support 26 for a rock shaft 38 which has rearwardly extending cranks or shoes 39 at the sides of the king pin 30 for engagement with the pins 24 to unlock or release the knuckles 16 when closed. The rock shaft 38 has a forwardly extending crank 40 connected by a link 41 to a bell crank 42 pivotally connected to a bracket 43, supported from the platform 12. The bell crank 42 has a forwardly extending rod 44 which may be operated by the driver of the tractor to actuate the locking mechanism of of the coupler knuckles 16.

Before considering other forms of king pins, I will briefly review coupling and uncoupling operations for the tractor trailer combination.

Assuming the trailer is independent of the tractor with its support 8 on the ground and that the rear end of the tractor is backed under the forward end of the trailer, the trailer wheels 11 will be supported by the platform 12 and the abutment 10 of the king pin 30 brought into engagement with the cross head 32, as shown in Fig. 4. The springs 45 are stiff enough to support the king pin against the cross head 10, and during rearward movement of the tractor, cause the cross head 10 to be pushed rearwardly and the support 8 raised to an inactive position. As the king pin 30 passes into the coupler head 14, it encounters and pushes rearwardly on the knuckle actuating member 18 which causes the knuckles 16 to close about the king pin. As the knuckles 16 swing to a closed position the locking members 22 enter the jaw openings 23 and thus lock the knuckles 16 in a closed position to prevent accidental uncoupling of the tractor and trailer during the combined service operation. Pushing rearwardly on the knuckle actuating member 18 removes the brake setting member 20 from beneath the roller 7 and the shoe 6 is placed in an operative position relative to the brake pin 35, so that the trailer brakes may be controlled from the tractor or automatically controlled by the trailer attempting to overrun the tractor.

When the tractor starts to pull the trailer, particularly under a load condition, the upper end of the king pin 30 may swing rearwardly thus establishing a draft relation between the tractor and trailer, but eventually the springs 45 restore the king pin to a normal upright position so that it and the wheels 11 on the platform 12 establish a fifth wheel action for the tractor and trailer combination.

To uncouple the tractor from the trailer it is necessary that the driver of a tractor operate the rod 44 to raise the shoes 39, pins 24 and locking members 22. As the king pin 30 is pulled forwardly from between the jaws 15 the knuckles 16 are forced to an open position and the knuckle actuating member 18 is shifted forwardly to place the brake setting member 20 under the roller 7 and thereby set the trailer brakes. This prevents the trailer from following the tractor during an uncoupling operation, and while this is taking place the cross head 10 due to the gravity action of the support 8 is following the king pin 30 until the support 8 approaches the ground and eventually supports the forward end of the trailer independent of the tractor. All these operations are timed relative to one another so that there cannot be any mishap that would endanger the trailer or load carried thereby.

Reference will now be had to Figs. 7 and 8 showing another form of yieldable or oscillatory king pin. A tractor platform 46 has an opening 47 for a laminated vertically disposed spring 48 which has its lower end mounted in a bracket 49 and retained therein by a clamp plate 50. Mounted on the upper end of the spring 49 is a king pin 51 and extending through said pin is a brake pin 52. The lower end of the brake pin 52 is normally supported by a bell crank 53 having a forwardly extending reach rod 54. The bell crank 53 is loosely mounted on a rock shaft 55 having fixed forwardly extending shoes 56 and a crank 57 provided with a reach rod 58.

The trailer equipment includes a coupler head which I have generally designated 59 because it is similar to the trailer coupler head previously described, with the following exception. The knuckle actuating member 18 has an opening providing clearance for a single support operating member 60 which has a head 61 engaging the king pin 51 when the tractor is coupled to the trailer. The trailer support can therefore be held in a raised inactive position, but when the king pin 51 withdraws from the coupler head 59 the support operating member 60 may move forwardly and permit the trailer support to engage the ground. In some instances I may dispense with the brake setting hand lever 5 and simply use the shoe 6 for engagement with the upper end of the brake pin 52 whereby the trailer brakes may be controlled from the tractor.

Another form of oscillatory king pin is shown in Figs. 9 and 10 where the pin 62 has its lower end pivotally supported, as at 63 between depending brackets 64 of a tractor platform 65. The king pin 62 extends upwardly through an opening in the platform and through a resilient buffer 66 mounted in a casing 67 mounted on the platform 65. The buffer 66 is preferably made of rubber or other yieldable material and can be easily renewed, by removing the casing 67, when the resiliency or cushion proclivities of the buffer have been destroyed. In this arrangement a rock shaft 68 is arranged above the platform 65 and provided with shoes 69 for knuckle releasing purposes. In the king pin 62 is a brake pin 70 operatable by a bell crank 71 suitably supported under the platform 65.

Still another buffer or spring formation is shown in Fig. 11 for the pivotally mounted king pin 62. In this instance front and rear sides of the king pin 62 have holders 72 for laminated or leaf springs 73 that are semi-elliptic. The springs are horizontally disposed with the ends thereof loosely mounted in sockets 74 on a platform 75.

In all of these modifications the king pin is supported to swing back and forth and afford a draft appliance performance for a tractor trailer combination.

While in the drawings there are illustrated the preferred embodiment of my invention, it is to be understood that the structural elements are susceptible to such variations and modifications as fall within the scope of the appended claims.

What I claim is:—

1. In a tractor trailer combination wherein a tractor is adapted to be coupled to a trailer with the trailer in superposed relation to the tractor, a coupler for said tractor and trailer, said coupler being inactive in the support of the load weight of the trailer, said coupler including a normally upright oscillatory member, and tractor supporting means for said member.

2. In a tractor trailer combination, a tractor, a trailer, said tractor and trailer being adapted to be coupled with the trailer in superposed relation to the tractor, a coupler head carried by said trailer, and an oscillatory member carried by said tractor and adapted to be held by said coupler head, said head and member being inactive in the support of the load weight of the trailer.

3. A tractor trailer combination as called for in claim 2, and releasable means in said coupler head adapted to lock said member in engagement with said head, said means being releasable from under said head and at opposite sides of said member.

4. In a tractor trailer combination wherein a tractor is adapted to have its rear end backed under the forward end of a trailer to support the forward end of the trailer, and wherein said trailer has a brake mechanism operatable from the forward end of said trailer;—a coupler for said tractor and trailer, said coupler comprising an oscillatory tractor pin, a trailer head adapted to receive and hold said pin, and means operatable through said oscillatory pin adapted for controlling said trailer brake mechanism.

5. In a tractor trailer combination wherein a tractor is adapted to have its rear end backed under the forward end of a trailer to support the forward end of the trailer, and wherein said trailer has a brake mechanism operatable from the forward end of said trailer;—a coupler for said tractor and trailer, said coupler comprising an oscillatory tractor pin, a trailer head adapted to receive and hold said pin, and means operatable through said oscillatory pin, for controlling said trailer brake mechanism, said means being constructively arranged for automatic actuation when said trailer attempts to overrun said tractor.

6. In a tractor trailer combination wherein a tractor is adapted to have its rear end backed under the forward end of a trailer to support the forward end of the trailer, and wherein said trailer has a brake mechanism operatable from the forward end of said trailer;—a coupler for said tractor and trailer, said coupler comprising an oscillatory tractor pin, having an upper end swingable in a vertical longitudinal plane of the tractor, a trailer head adapted to receive said oscillatory pin, knuckles in said head adapted for holding said oscillatory pin therein, and means operatable in the longitudinal direction of said pin adapted for controlling the trailer brakes.

7. In a tractor trailer combination wherein a trailer has brakes applied for tractor coupling purposes, and wherein said trailer has a raisable support adapted to be raised when a tractor is coupled to said trailer;—a tractor adapted to be coupled to said trailer, an oscillatory coupler pin on said tractor, a trailer coupler head adapted to receive and hold said pin, trailer means engageable by said pin adapted to release said trailer brakes, and trailer means engageable by said pin in advance of the first mentioned means adapted for raising said support.

8. A tractor trailer combination as called for in claim 7, wherein said trailer coupler head is characterized by opposed pin engaging knuckles, either of which may cooperate with said head in holding said pin independent of the other knuckle.

9. A tractor trailer combination as called for in claim 7, wherein said tractor coupling head is characterized by opposed knuckles adapted to engage said pin, knuckle locking means in said head, and means on said tractor adjacent said pin adapted for actuating said knuckle locking means.

10. In a tractor trailer combination wherein a tractor is adapted to be coupled to a trailer with the trailer in superposed relation to the tractor, a tractor coupler pin, means supporting said pin on said tractor so that the upper end of the pin may swing in a longitudinal vertical plane of the tractor, means at the lower end of said pin adapted to resist such swinging movement of the pin and maintain said pin normally upright, and a coupler head adapted to receive and hold said pin to establish a combined service relation between said tractor and trailer, said pin and head being inactive in the support of the load weight of the trailer.

11. A tractor trailer combination as called for in claim 10, wherein said trailer coupler head includes opposed pin engaging knuckles either of which may cooperate with said head in holding said pin independent of the other knuckle.

12. In a tractor trailer combination, a tractor having a coupler pin, and a trailer connected to said pin with a fifth wheel action relative to said trailer, said pin having its upper end swingable in a vertical longitudinal plane of the tractor to afford a draft appliance performance for the connection between said tractor and trailer, said tractor and trailer coupling structure being inactive in the support of the load weight of the trailer.

13. In a tractor trailer combination, a tractor, a coupler pin on said tractor having a portion thereof held against longitudinal movement relative to said tractor and another portion thereof supported to yield in a longitudinal vertical plane of said tractor, a trailer, and means on said trailer engageable with the yieldable portion of said pin adapted for coupling said tractor and trailer together, said tractor and trailer coupling structure being inactive in the support of the load weight of the trailer.

14. In a tractor trailer combination, a tractor, a trailer, said tractor and trailer being adapted to be coupled with the trailer in superposed relation to the tractor, a coupler head carried by said trailer, an oscillatory member carried by said tractor and adapted to be held by said coupler head, said head and member being inactive in the support of the load weight of the trailer, releasable means in said coupler head adapted to lock said member in engagement with said head, said means being releasable from under said head.

15. In a tractor trailer combination, a tractor, a trailer, a brake mechanism for the trailer, a coupler for said tractor and trailer, said coupler comprising an oscillatory tractor pin, a trailer head adapted to receive and hold said pin, and means operatable lengthwise of said oscillatory pin for controlling said trailer brake mechanism.

16. In a tractor trailer combination, a tractor, a trailer, said tractor and trailer being adapted to be coupled with the trailer in superposed relation to the tractor, a coupler for said tractor and trailer, said coupler being inactive in the support of the load weight of the trailer and including a head and an oscillatory member held thereby with said head and member being disengagable for uncoupling the tractor and trailer.

17. In a tractor trailer combination, a tractor, a trailer, said tractor and trailer being adapted to be coupled with the trailer in superposed relation to the tractor, a coupler for the tractor and trailer, said coupler being inactive in the support of the load weight of the trailer and including a head, a member adapted to be engaged and held by the head, said head being yieldable in an oscillatory path, and a knuckle carried by the head engageable with the member for coupling said head and member together.

18. A tractor trailer coupler as called for in claim 17, and knuckle locking means in said head.

19. A coupler for a tractor trailer combination, comprising a coupler head, an oscillatory pin adapted to be held by said head, and pin engaging knuckles in said head with either of said knuckles adapted to cooperate with said head in holding said pin independent of the other knuckle, the zone of pin and knuckle engagement being positioned above and spaced from the axis of oscillatory movement of the pin, the mounting of the pin being such as to permit pin oscillation by relative movement of tractor of trailer in the direction of traction when the pin and knuckles are coupled together.

20. In a tractor trailer combination wherein a tractor is adapted to be coupled to a trailer with the trailer in superposed relation to the tractor, a tractor coupler pin, disposed to have its upper end swing in an arc, a coupler head adapted to receive the pin and hold said pin to establish a combined service relation between said tractor and trailer, said pin and head being inactive in the support of the load weight of the trailer, and means below said head adapted to resist movement of the upper end of said pin in an arcuated path and maintain said pin normally upright.

21. In a tractor trailer combination, a tractor, a trailer, said tractor and trailer being adapted to be coupled with the trailer in superposed relation to the tractor, a coupler being inactive in the support of the load weight of the trailer and for said tractor and trailer, said coupler including a head, an oscillatory pin adapted to be engaged by said head, and means engaging side walls of said pin adapted to maintain said pin normally vertical.

22. A tractor trailer coupler as called for in claim 21, wherein said means includes yieldably opposed members.

In testimony whereof I affix my signature.

SIDNEY B. WINN.